US007499783B2

(12) United States Patent
Oka

(10) Patent No.: US 7,499,783 B2
(45) Date of Patent: Mar. 3, 2009

(54) HYDRAULIC CONTROL APPARATUS FOR HYDRAULIC EXCAVATOR

(75) Inventor: Hidekazu Oka, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 354 days.

(21) Appl. No.: 11/426,701

(22) Filed: Jun. 27, 2006

(65) Prior Publication Data

US 2007/0016349 A1 Jan. 18, 2007

(30) Foreign Application Priority Data

Jul. 15, 2005 (JP) ............................ 2005-207206

(51) Int. Cl.
*G06F 7/70* (2006.01)

(52) U.S. Cl. ............................ 701/50; 60/421; 60/429; 60/430

(58) Field of Classification Search .................. 701/50; 60/421, 429, 430
See application file for complete search history.

(56) References Cited

U.S. PATENT DOCUMENTS 5,890,303 A 4/1999 Ishikawa et al.
5,970,709 A * 10/1999 Tohji .......................... 60/421
6,148,548 A * 11/2000 Tohji .......................... 37/348
2005/0204734 A1 9/2005 Oka

FOREIGN PATENT DOCUMENTS

| | | |
|---|---|---|
| EP | 1 416 096 A1 | 5/2004 |
| JP | 9-177139 | 7/1997 |
| JP | 2003-90302 | 3/2003 |
| JP | 2004-150198 | 5/2004 |
| JP | 2005-299376 | 10/2005 |

* cited by examiner

*Primary Examiner*—Mark Hellner
(74) *Attorney, Agent, or Firm*—Oblon, Spivak, McClelland, Maier & Neustadt, P.C.

(57) ABSTRACT

A first group is supplied with hydraulic power from a first hydraulic pump. In the first group, an arm control valve is disposed at the most downstream position. A throttle is provided at the entrance of the arm control valve. Thus, a circuit is configured to give priority to boom raising or bucket excavation. During a combined operation, according to the operation amount of boom pulling or bucket excavation, a controller decreases the upper limit of the discharge amount of the first hydraulic pump determined by the operation amount of arm pulling and increases the recycling rate of oil to the expansion side of an arm cylinder.

4 Claims, 4 Drawing Sheets

HYDRAULIC CONTROL APPARATUS FOR HYDRAULIC EXCAVATOR

BACKGROUND OF THE INVENTION

1. Field of the Invention

The present invention relates to a hydraulic control apparatus for a two-pump hydraulic excavator that has two hydraulic pumps as hydraulic power sources for hydraulic actuators.

2. Description of the Related Art

FIG. 6 shows a hydraulic circuit of a hydraulic excavator including a boom cylinder 4, an arm cylinder 5, and a bucket cylinder 6.

In this circuit, first and second hydraulic pumps 7 and 8 are driven by an engine (not shown). The first hydraulic pump 7 drives the boom cylinder 4, the arm cylinder 5, and the bucket cylinder 6. The second hydraulic pump 8 drives the boom cylinder 4, the arm cylinder 5, and a swiveling motor 9.

Control valves for controlling operations of the hydraulic actuators are separated into two groups. A first group G1 includes a first boom control valve 10, a bucket control valve 11, and a second arm control valve 12, which are supplied with hydraulic power from the first hydraulic pump 7. A second group G2 includes a second boom control valve 13, a swiveling control valve 14, and a first arm control valve 15, which are supplied with hydraulic power from the second hydraulic pump 8.

The center bypass passages of the control valves of the groups G1 and G2 are connected to the hydraulic pumps 7 and 8, respectively, in series by tandem circuits 16 and 17, respectively. The pump ports of the control valves of the groups G1 and G2 are connected to the hydraulic pumps 7 and 8, respectively, in parallel by parallel circuits 18 and 19, respectively.

In order to prevent the oil discharged from the pumps from being supplied only to the arm cylinder 5, which has a relatively light load, during a combined operation of arm pulling and boom raising or bucket excavation (hereinafter simply referred to as "combined operation of arm pulling and boom raising"), (i) the arm control valves 12 and 15 are disposed at the most downstream positions with respect to the pumps 7 and 8 in the groups G1 and G2; and (ii) a throttle 20 is provided at the entrance of the second arm control valve 12 in the parallel circuit 18 of the first group G1.

Thus, during the combined operation, the oil discharged from the first hydraulic pump 7 is preferentially supplied to the boom cylinder 4 or the bucket cylinder 6, and operation of the cylinders 4 and 6 is ensured.

At this time, the oil discharged from the second hydraulic pump 8 is sent to the arm cylinder 5 via the parallel circuit 19 and the first arm control valve 15 of the second group G2. Therefore, a flow necessary for the arm cylinder 5 is secured. The control valves 10, 13, 11, 12, and 15 are controlled by a boom remote control valve 21, a bucket remote control valve 22, and an arm remote control valve 23.

Here, attention is focused solely on the combined operation of arm pulling, whose operating pressure is relatively low, and operation of an actuator whose operating pressure is higher than this (boom raising or bucket excavation in the circuit of FIG. 6). Therefore, to simplify the figure, the remote control valve for swiveling, which is unrelated to the focus, is omitted. In addition, of pilot lines connecting the remote control valves 21 to 23 and the control valves 10, 13, 11, 12, and 15, only a boom raising pilot line 24, a bucket excavation pilot line 25, and an arm pulling pilot line 26 are shown.

Reference numerals 27 and 28 denote pump pressure sensors that detect the discharge pressures (pump pressures) of the pumps 7 and 8. The sensors 27 and 28 send pump pressure signals to a controller 29. The controller 29 sends control signals for controlling the pump discharge amounts to proportional valves 30 and 31 serving as pump regulators. That is to say, in order to prevent engine stall, the pump discharge amounts are controlled according to the pump pressures (horsepower control). In FIG. 6, reference character T denotes a tank.

In this configuration, during a combined operation including arm pulling (the case of arm pulling and boom raising will be described), the oil discharged from the hydraulic pumps 7 and 8 is supplied to the expansion side of the boom cylinder 4 via the boom control valves 10 and 13, and to the expansion side of the arm cylinder 5 via the arm control valves 12 and 15.

At this time, the oil discharged from the first hydraulic pump 7 is throttled on the upstream side of the tandem circuit 16 of the first group G1, by the center bypass passage of the boom control valve 10. Therefore, extra heat is generated in this part.

In addition, due to the throttling in this bypass passage, the pump pressure increases. Therefore, the horsepower control is performed not only on the first hydraulic pump 7 but also on the second hydraulic pump 8, and the flow of the entire circuit decreases.

As a result, the amount of the oil supplied to the arm cylinder 5 decreases. Therefore, the operating speed of the arm 2 decreases.

As a remedy for this, in order to ease the throttling in the center bypass passage of the boom control valve 10, the opening of this bypass passage can be enlarged.

However, in this case, during the combined operation, oil is mostly supplied to the arm cylinder 5, which has a lighter load, and the boom cylinder 4 does not operate. That is to say, it is meaningless to dispose the boom control valve 10 on the upstream side of the tandem circuit 16 and to dispose the arm control valve 12 at the most downstream position in the tandem circuit 16.

In a known technique, instead of the throttle 20 in the parallel circuit 18, a flow control valve is provided so as to increase the amount of the oil sent to the arm cylinder 5 via the parallel circuit 18 during the combined operation (see Japanese Unexamined Patent Application Publication No. 9-177139).

If this technique is adopted, since the amount of the oil sent to the arm cylinder 5 via the parallel circuit 18 during the combined operation increases, the operating speed of the arm cylinder 5 can be increased. In addition, since the amount of the oil passing through the tandem circuit 16 decreases, extra heat generation can be controlled.

However, the flow control valve is much more expensive than the throttle 20. In addition, a control system therefor is necessary. Therefore, the cost is considerably increased.

Moreover, since the flow control valve needs to be newly incorporated into the circuit, it is difficult to apply this technique to an existing machine.

SUMMARY OF THE INVENTION

It is an object of the present invention to provide a hydraulic control apparatus for a hydraulic excavator that can control the extra heat generation in a tandem circuit and the decrease in the arm speed during a combined operation in which arm pulling operation by an arm control valve and operation of another control valve in the same group are performed, at a low cost, and can be easily applied to an existing machine.

A hydraulic control apparatus for a hydraulic excavator according to the present invention has the following basic configuration.

That is to say, the hydraulic control apparatus of the present invention includes a plurality of control valves that control operations of a plurality of hydraulic actuators. The plurality of control valves include first and second arm control valves operated by a common operating means. The plurality of control valves are separated into a first group including one of the first and second arm control valves and a second group including the other arm control valve. The first and second groups are connected to first and second hydraulic pumps respectively. Each arm control valve is disposed at the most downstream position in the group. Control valves of each group are connected in series by a tandem circuit and in parallel by a parallel circuit. The tandem circuit connects center bypass passages of the control valves. The parallel circuit connects pump ports of the control valves. The apparatus further includes a throttle provided at the entrance of the arm control valve in the parallel circuit of the first group for preferentially supplying oil discharged from the first hydraulic pump to the other control valves in the first group. The apparatus further includes a control means that controls the pump discharge amounts according to the operation amounts of the arm control valves. In this apparatus, during a combined operation in which arm pulling operation of the arm control valve in the first group and operation of another control valve in the first group are performed simultaneously, the control means decreases the upper limit of the discharge amount of the first hydraulic pump determined by the operation amount of arm pulling operation, according to the increase in the operation amount of the other control valve.

According to the present invention, during a combined operation in which the arm control valve in the first group and another control valve in the first group are operated simultaneously, the upper limit of the pump discharge amount determined by the arm pulling operation amount is decreased according to the operation amount of the other control valve. Therefore, the flow in the center bypass passage on the upstream side of the tandem circuit in the first group can be deceased, and the heat generation due to the throttling of the bypass passage can be controlled.

In this case, since the flow decreases according to the increase in the operation amount of the other control valve (according to the decrease in the size of the opening of the center bypass passage), the heat generation can be prevented more effectively.

DESCRIPTION OF THE PREFERRED EMBODIMENTS

Figure 5:
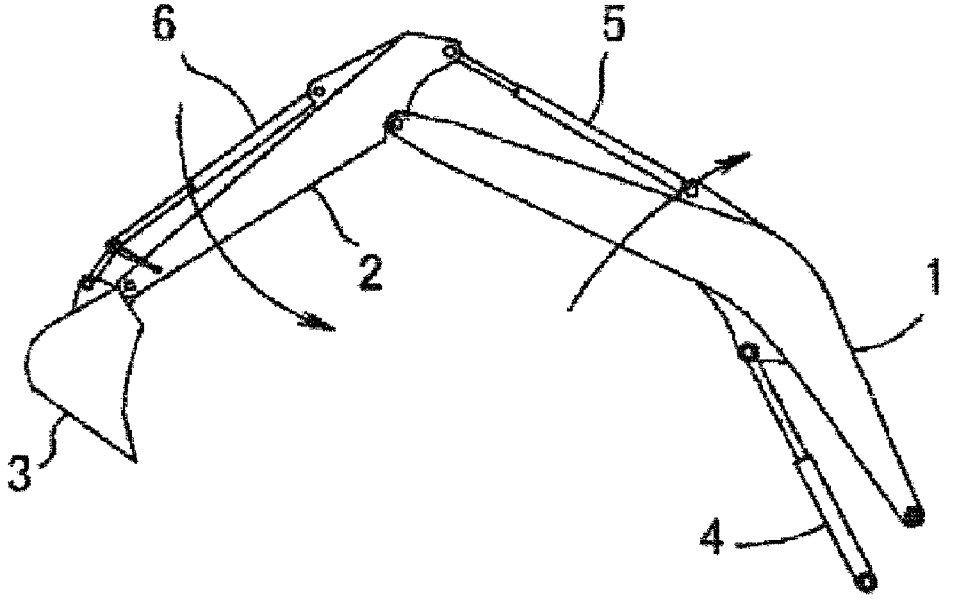
FIG. 5 is a side view of a working attachment of a hydraulic excavator.

The hydraulic excavator to which the hydraulic control apparatus of the present invention is applied has a working attachment. As shown in FIG. 5, the working attachment includes a boom 1, an arm 2, a bucket 3, and boom, arm, and bucket cylinders 4, 5, and 6 driving them. By raising and lowering the boom 1, pushing (upward swinging) and pulling (downward swinging) the arm 2, and excavating (shoveling) with the bucket 3 and emptying the bucket 3, various works such as excavation and loading are performed.

An embodiment of the present invention will be described with reference to FIGS. 1 to 4.

Figure 1:
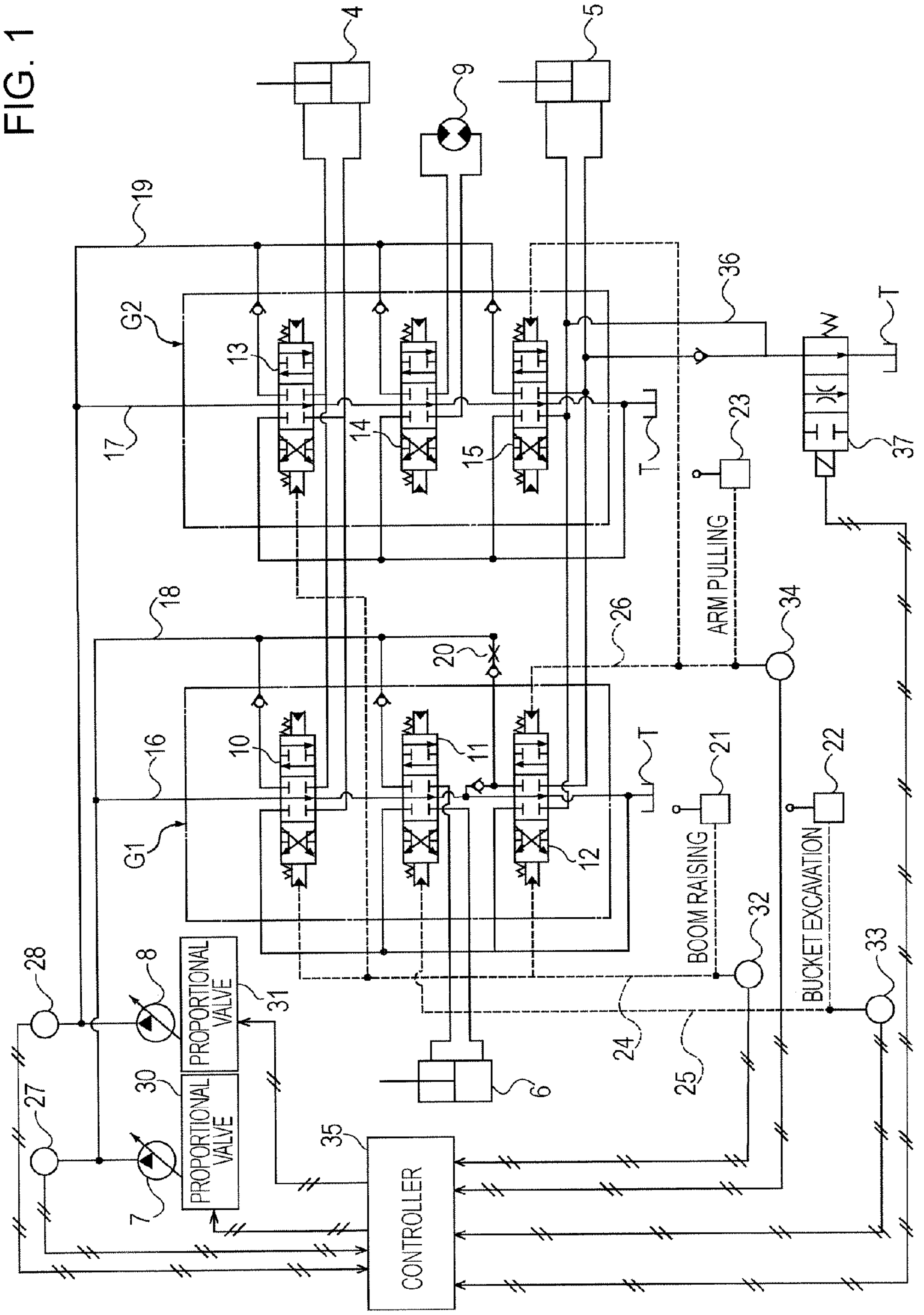
FIG. 1 shows the circuit configuration of a hydraulic control apparatus according to an embodiment of the present invention.

FIG. 1 shows the circuit configuration of a hydraulic control apparatus for a hydraulic excavator according to this embodiment. In the circuit of this embodiment, the same reference numerals will be used to designate the same components as those in the related art shown in FIG. 6, so that the description will be omitted.

As with the circuit of the related art, this circuit includes first and second hydraulic pumps 7 and 8. The first hydraulic pump 7 is connected to a first group G1 including a first boom control valve 10, a bucket control valve 11, and a second arm control valve 12 by a tandem circuit 16 and a parallel circuit 18. The second hydraulic pump 8 is connected to a second group G2 including a second boom control valve 13, a swiveling control valve 14, and a first arm control valve 15 by a tandem circuit 17 and a parallel circuit 19.

Figure 6:
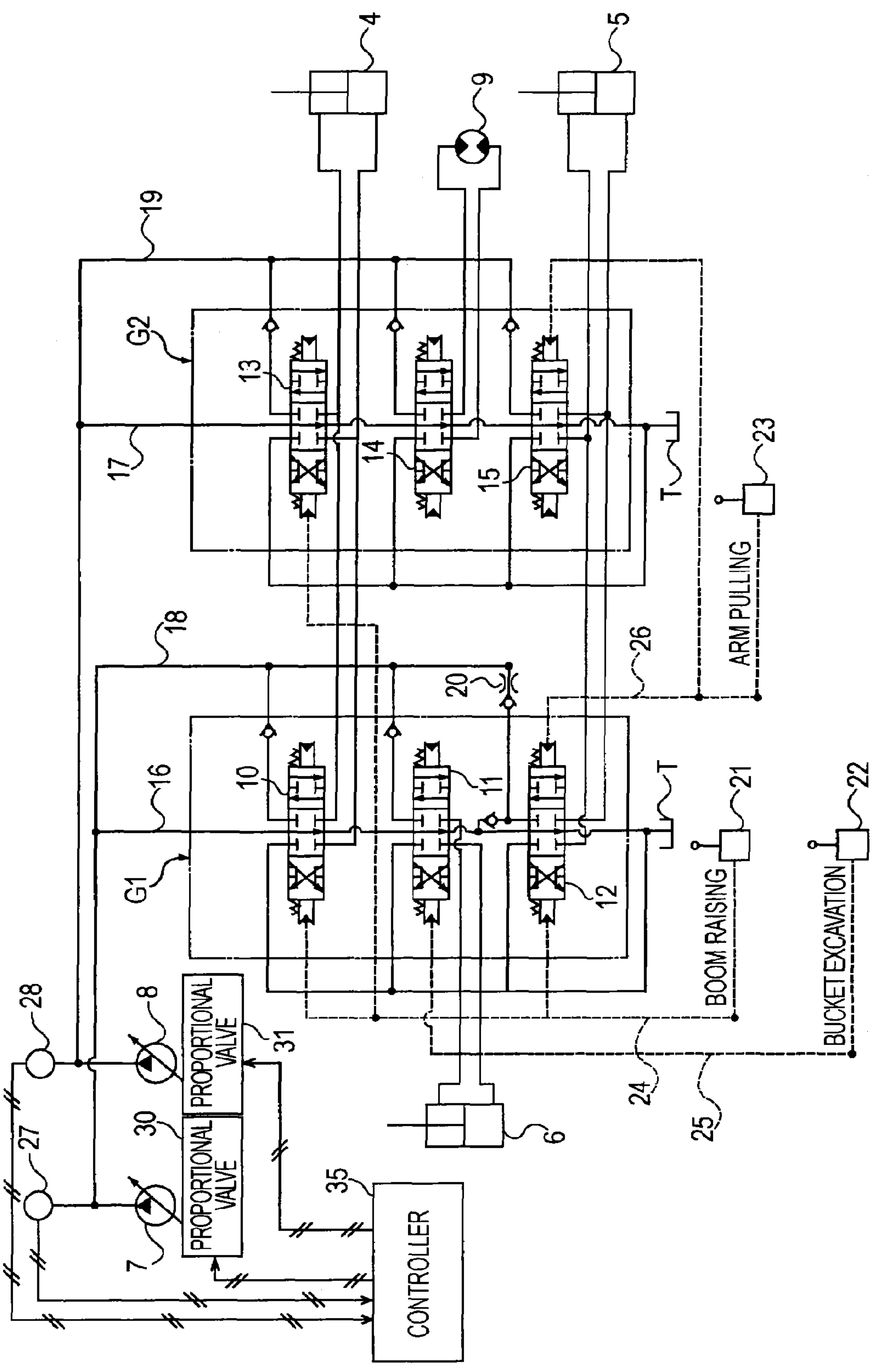
FIG. 6 PRIOR ART
FIG. 6 shows the circuit configuration of the related art.

As in the circuit of FIG. 6, in the groups G1 and G2, the arm control valves 12 and 15 are disposed at the most downstream positions in the tandem circuits 16 and 17, and a throttle 20 is provided at the entrance of the second arm control valve 12 in the parallel circuit 18 of the first group G1.

In the circuit of this embodiment, a boom raising pilot line 24, a bucket excavation pilot line 25, and an arm pulling pilot line 26 are provided with pilot pressure sensors 32, 33, and 34, respectively. The pilot pressures, that is to say, the operation amounts of boom raising, bucket excavation, and arm pulling are detected by the pilot pressure sensors 32, 33, and 34, respectively, and are sent to a controller 35 serving as a control means.

Figure 2:
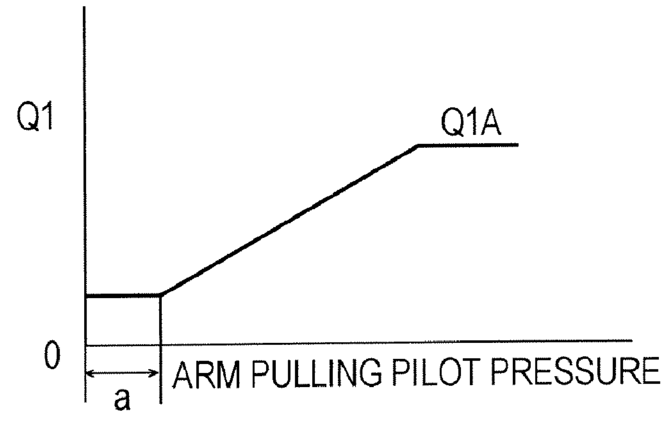
FIG. 2 shows the relationship between the arm pulling pilot pressure and the discharge amount of the first hydraulic pump in the apparatus.
Figure 3:
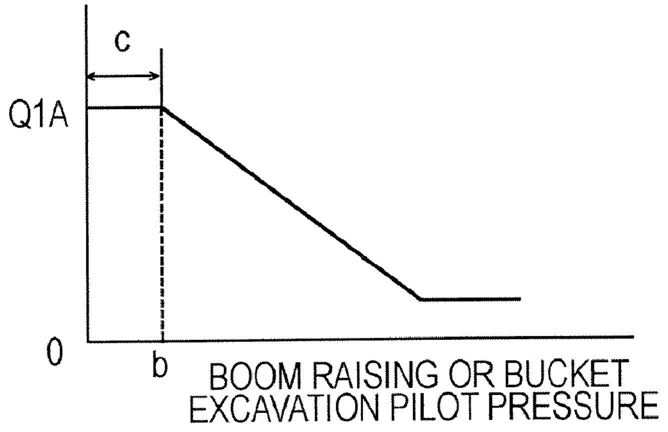
FIG. 3 shows the relationship between the boom raising or bucket excavation pilot pressure and the upper limit of the discharge amount of the first hydraulic pump in the apparatus.

The controller 35 controls the discharge amounts of the hydraulic pumps 7 and 8 on the basis of the preset and prestored characteristic diagrams of FIGS. 2 and 3, according to the detected operation amounts, via the proportional valves 30 and 31.

FIG. 2 shows the relationship between the arm pulling pilot pressure (operation amount) and the discharge amount Q1 of the first hydraulic pump 7, which changes depending on this pilot pressure. In proportion to the increase in the arm pulling pilot pressure, the pump discharge amount Q1 increases up to the upper limit Q1A. Reference character a in FIG. 2 denotes a pilot pressure section in the early stage of operation in which the pump discharge amount Q1 does not change.

FIG. 3 shows the relationship between the boom raising or bucket excavation pilot pressure (operation amount, hereinafter simply referred to as "boom raising pilot pressure") and the upper limit Q1A of the pump discharge amount of FIG. 2 during a combined operation of arm pulling and boom raising or bucket excavation.

As shown in the figure, the upper limit Q1A is set so as to decrease in proportion to the increase in the boom raising pilot pressure except for section c in which the boom raising pilot pressure is from zero to a predetermined value b.

On the basis of this setting, during the combined operation of arm pulling and boom raising or bucket excavation, the controller 35 decreases the upper limit Q1A of the discharge amount of the first hydraulic pump 7 determined by the arm pulling operation amount, according to the increase in the boom raising pilot pressure.

This control is characterized in that the controller 35 decreases the upper limit Q1A of the discharge amount of the first hydraulic pump 7 determined by the arm pulling operation amount, according to the increase in the operation amount of the other control valve.

Due to this control, the flow in the center bypass passage on the upstream side of the tandem circuit 16 in the first group G1 (in the center bypass passage of the first boom control valve 10 or the bucket control valve 11) decreases. Therefore, the heat generation due to the throttling of the passage can be controlled.

In this case, according to the increase in the operation amount of boom raising or bucket excavation (according to the decrease in the size of the opening of the center bypass passage), the upper limit Q1A decreases, and the flow in the first group G1 decreases. Therefore, the heat generation can be prevented more effectively.

During the combined operation of arm pulling and boom raising or bucket excavation, as described above, generally, the arm is rapidly pulled and the boom or the bucket is slowly operated. Therefore, if the above-described control is not performed, the discharge amount of the first hydraulic pump 7 increases according to the large amount of arm pulling operation, and the heat generation in the bypass passage tends to occur. In view of this, performing the above-described control during the combined operation of arm pulling and boom raising or bucket excavation particularly effectively prevents the heat generation.

On the other hand, the decrease in the pump discharge amount due to the above-described control controls the increase in the pump pressure of the first hydraulic pump 7. Therefore, the decrease in the discharge amount of the second hydraulic pump 8 due to the horsepower control, that is to say, the decrease in the amount of the oil supplied to the arm cylinder 5 from the pump 8 can be controlled. Therefore, the decrease in the arm speed during the combined operation can be controlled.

In addition, since the above-described working can be obtained only by controlling the first hydraulic pump 7, unlike the known art disclosed in Japanese Unexamined Patent Application Publication No. 9-177139, it is not necessary to add an extra valve (flow control valve as an alternative to the throttle 20). Therefore, the expected object of controlling the heat generation and the decrease in the arm speed can be attained at a low cost. In addition, this embodiment can be easily applied to an existing machine.

However, it is inevitable that the amount of the oil supplied to the arm cylinder 5 from the first hydraulic pump 7 is decreased by decreasing the upper limit of the discharge amount of the pump 7 as described above. Consequently, the decrease in the arm speed is inevitable. With the increase in the operation amount of boom raising or bucket excavation, this tendency becomes stronger, and the amount of the oil supplied to the arm cylinder from the second hydraulic pump 8 also decreases. Therefore, if no measures are taken, the decrease in the arm speed is inevitable.

To solve this problem, in this embodiment, a recycling circuit 36 and a recycling valve 37 are provided. The recycling circuit 36 re-supplies oil from the contraction side to the expansion side of the arm cylinder 5. The recycling valve 37 controls the recycling flow in the recycling circuit 36.

Figure 4:
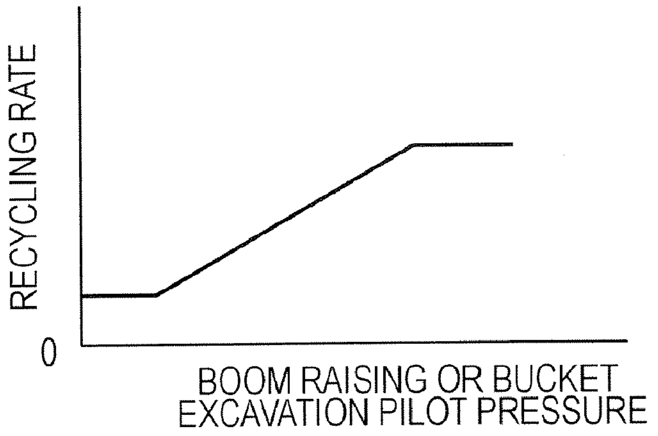
FIG. 4 shows the relationship between the boom raising or bucket excavation pilot pressure and the recycling rate of oil in the arm cylinder in the apparatus.

The recycling valve 37 is an electromagnetic flow control valve. During the combined operation, as shown in FIG. 4, the recycling valve 37 is controlled by the controller 35 so that the recycling rate increases according to the increase in the pilot pressure (operation amount) of boom raising or bucket excavation.

By this control, the amount of recycled oil can be increased against the decrease in the upper limit of the discharge amount of the first hydraulic pump 7. Therefore, a flow necessary for the arm cylinder 5 can be secured, and the speed of arm pulling can be made sufficiently high.

Although not shown, to simplify the illustration, in the circuit of the related art shown in FIG. 6, a recycling valve for an arm cylinder has been used in a hydraulic circuit of a hydraulic excavator. For the circuit of the embodiment, it is only necessary to modify the recycling valve control program of the controller 35 as described above. That is to say, compared to the circuit of the related art, there is almost no fear that employing the recycling valve 37 will increase the cost.

Although the invention has been described with reference to the preferred embodiments in the attached figures, it is noted that equivalents may be employed and substitutions made herein without departing from the scope of the invention as recited in the claims.

What is claimed is:

1. A hydraulic control apparatus for a hydraulic excavator comprising:

a plurality of control valves that control operations of hydraulic actuators, the plurality of control valves including first and second arm control valves operated by a common operating means, the plurality of control valves being separated into a first group including one of the first and second arm control valves and a second group including the other arm control valve;

first and second hydraulic pumps to which the first and second groups are connected respectively, each arm control valve being disposed at the most downstream position in the group, control valves of each group being connected in series by a tandem circuit and in parallel by a parallel circuit, the tandem circuit connecting center bypass passages of the control valves, the parallel circuit connecting pump ports of the control valves;

a throttle provided at the entrance of the arm control valve in the parallel circuit of the first group for preferentially supplying oil discharged from the first hydraulic pump to the other control valves in the first group; and a control means that controls the pump discharge amounts according to the operation amounts of the arm control valves, wherein during a combined operation in which arm pulling operation of the arm control valve in the first group and operation of another control valve in the first group are performed simultaneously, the control means decreases the upper limit of the discharge amount of the first hydraulic pump determined by the operation amount of arm pulling operation, according to the increase in the operation amount of the other control valve.

2. The hydraulic control apparatus for a hydraulic excavator according to claim 1, wherein the hydraulic actuators include a boom cylinder, an arm cylinder, and a bucket cylinder that drive a boom, an arm, and a bucket, respectively, and the boom, the arm, and the bucket constitute a working attachment.

3. The hydraulic control apparatus for a hydraulic excavator according to claim 1, further comprising:

a recycling circuit that returns part of oil on the contraction side of the arm cylinder to the expansion side; and a recycling valve that controls the recycling flow in the recycling circuit, wherein during the combined operation, the control means controls the recycling valve so that the recycling rate increases according to the increase in the operation amount of the other control valve.

4. The hydraulic control apparatus for a hydraulic excavator according to claim 1, wherein the control valves in the first group include a boom control valve and a bucket control valve, and during a combined operation of arm pulling and boom raising or bucket excavation, the control means decreases the upper limit of the discharge amount of the first hydraulic pump according to the operation amount of boom pulling or bucket excavation.

* * * * *